US012666476B2

(12) United States Patent
Lee et al.

(10) Patent No.: US 12,666,476 B2
(45) Date of Patent: Jun. 23, 2026

(54) METHOD AND APPARATUS FOR TRANSMITTING ISOCHRONOUS DATA IN SHORT-RANGE WIRELESS COMMUNICATION SYSTEM

(71) Applicant: LG ELECTRONICS INC., Seoul (KR)

(72) Inventors: Hyeonjae Lee, Seoul (KR); Minsoo Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 508 days.

(21) Appl. No.: 18/037,236

(22) PCT Filed: Nov. 16, 2021

(86) PCT No.: PCT/KR2021/016742
§ 371 (c)(1),
(2) Date: May 16, 2023

(87) PCT Pub. No.: WO2022/103237
PCT Pub. Date: May 19, 2022

(65) Prior Publication Data
US 2023/0422323 A1     Dec. 28, 2023

(30) Foreign Application Priority Data

Nov. 16, 2020     (KR) ........................ 10-2020-0152966

(51) Int. Cl.
*H04W 76/14*          (2018.01)
(52) U.S. Cl.
CPC ................................. *H04W 76/14* (2018.02)

(58) Field of Classification Search
CPC ... H04W 72/0446; H04W 4/80; H04W 84/20; H04W 76/14; H04L 1/16; Y02D 30/70; A63F 13/23; A63F 13/24
See application file for complete search history.

(56) References Cited

U.S. PATENT DOCUMENTS

| | | | | | |
|---|---|---|---|---|---|
| 10,136,429 | B2 * | 11/2018 | Lee | .................... | H04W 52/0241 |
| 2016/0359925 | A1 * | 12/2016 | Song | .................... | H04R 25/554 |

(Continued)

FOREIGN PATENT DOCUMENTS

| | | |
|---|---|---|
| KR | 1020170016883 | 2/2017 |
| WO | 2018169380 | 9/2018 |
| WO | 2020132839 | 7/2020 |

OTHER PUBLICATIONS

Kai Ren; 10 Frequently Asked Questions on LE Isochronous Channels; Bluetooth Blog, Mar. 2, 2020, see p. 2, figure 1.

*Primary Examiner* — Cindy Trandai
(74) *Attorney, Agent, or Firm* — BRYAN CAVE LEIGHTON PAISNER LLP

(57)          ABSTRACT

Provided are a method for transmitting isochonous data in a short-distance wireless communication system, and an apparatus therefor.
More specifically, the method for transmitting, by a slave device, isochronous data in a short-distance wireless communication system includes: establishing a connection with a master device to transmit the isochronous data to the master device; and transmitting, to the master device, the isochronous data through a channel for transmission of the isochronous data, based on the established connection, and the transmission of the isochronous data through the channel is performed based on a periodically allocated transmission interval, and the isochronous data is data generated based on a user input.

17 Claims, 20 Drawing Sheets

(56) References Cited

U.S. PATENT DOCUMENTS

| | | | | |
|---|---|---|---|---|
| 2017/0171798 A1* | 6/2017 | Song | | H04W 60/00 |
| 2017/0251469 A1* | 8/2017 | Lee | | H04W 72/0446 |
| 2020/0260322 A1* | 8/2020 | Chen | | H04L 1/16 |
| 2020/0275250 A1* | 8/2020 | Choi | | H04W 12/0431 |
| 2022/0095407 A1* | 3/2022 | Hirakawa | | H04W 76/20 |
| 2022/0103607 A1* | 3/2022 | Young | | G06F 3/167 |
| 2022/0124471 A1* | 4/2022 | Chen | | H04L 1/1874 |
| 2022/0253273 A1* | 8/2022 | Lee | | G06F 3/165 |
| 2022/0321368 A1* | 10/2022 | Lee | | H04L 12/1881 |
| 2022/0353616 A1* | 11/2022 | Lee | | H04R 5/04 |
| 2024/0056894 A1* | 2/2024 | Håland | | H04W 28/18 |
| 2024/0078076 A1* | 3/2024 | Lee | | G06F 3/165 |

* cited by examiner

【FIG. 1】
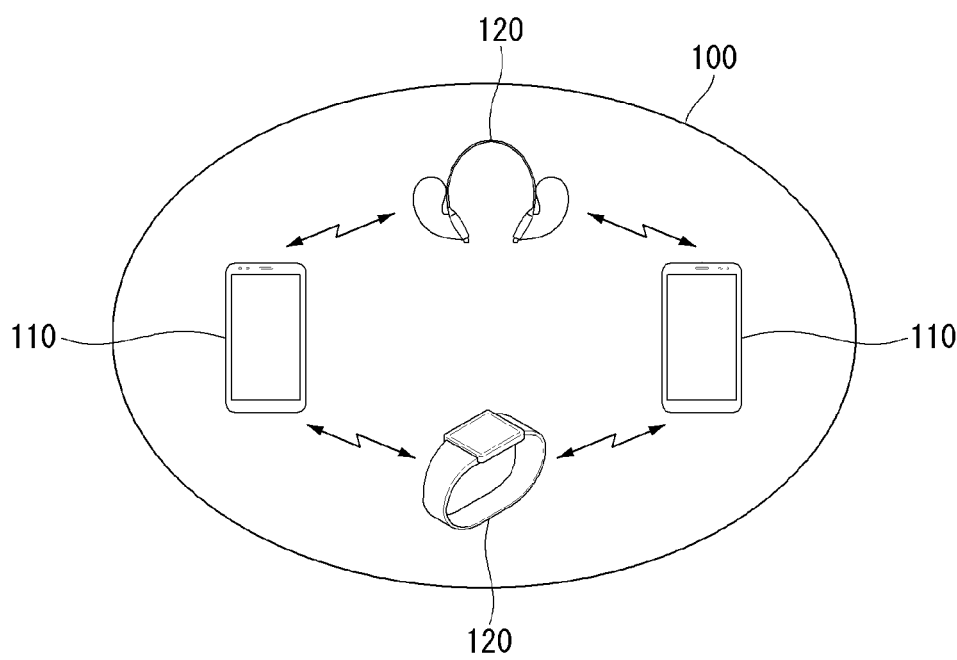

[FIG. 2]
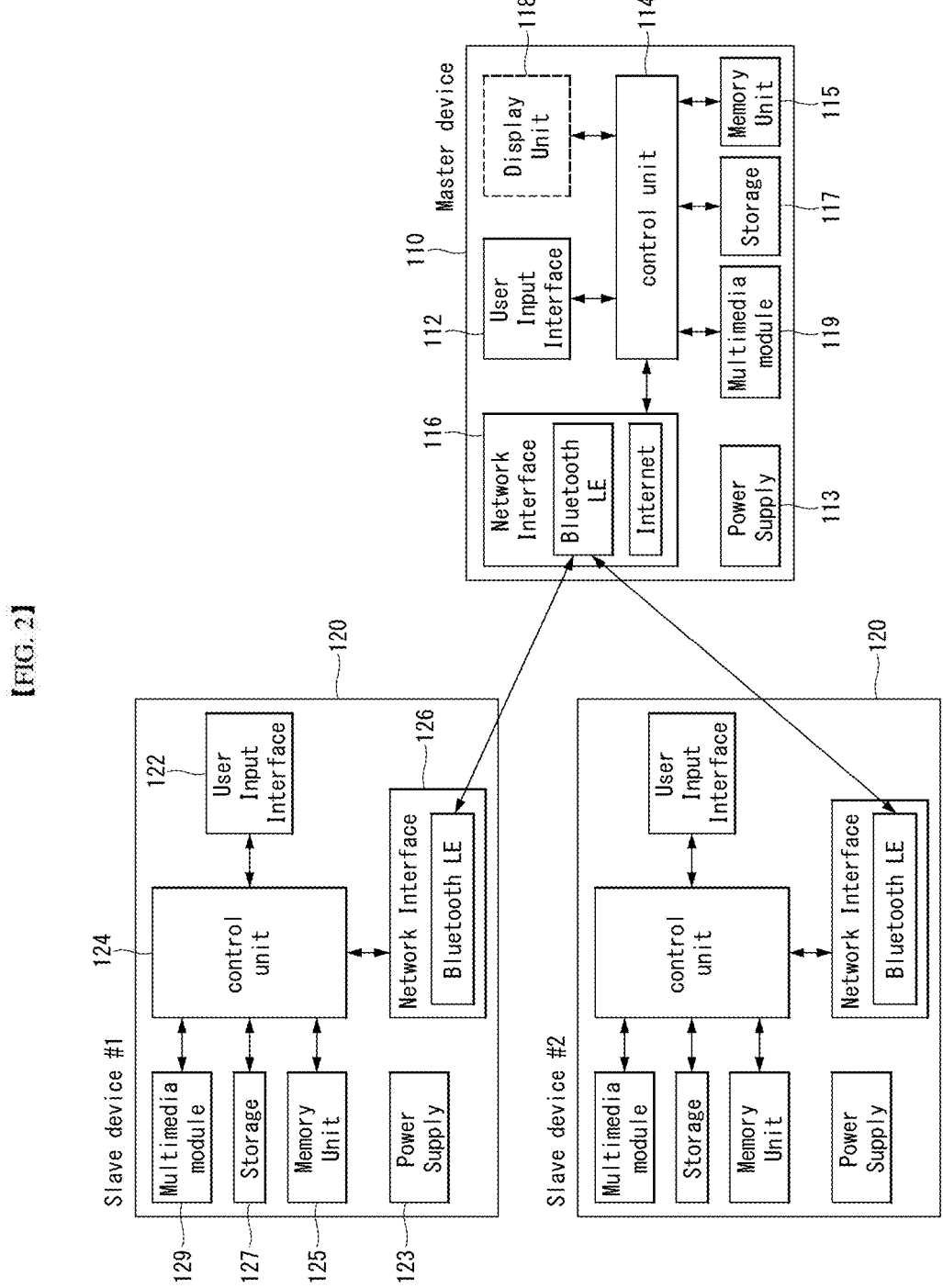

【FIG. 3】
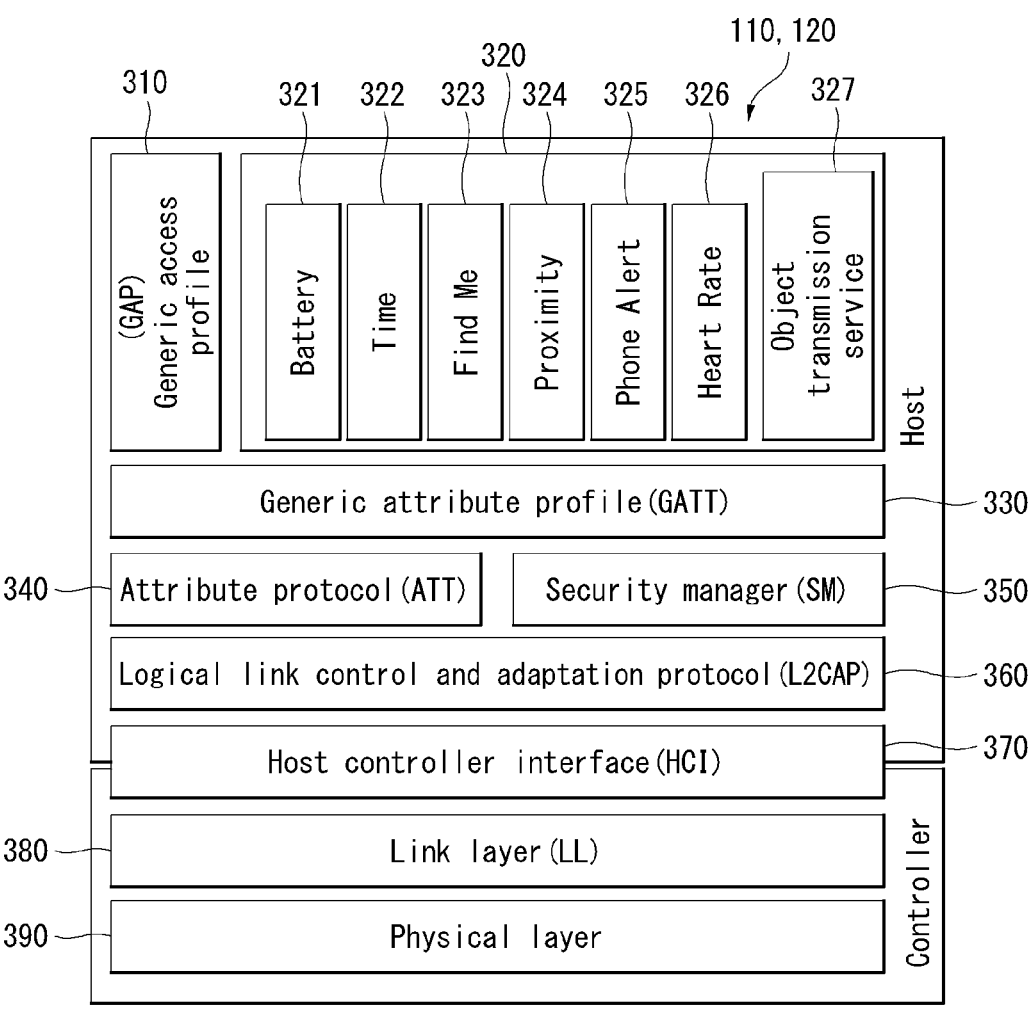

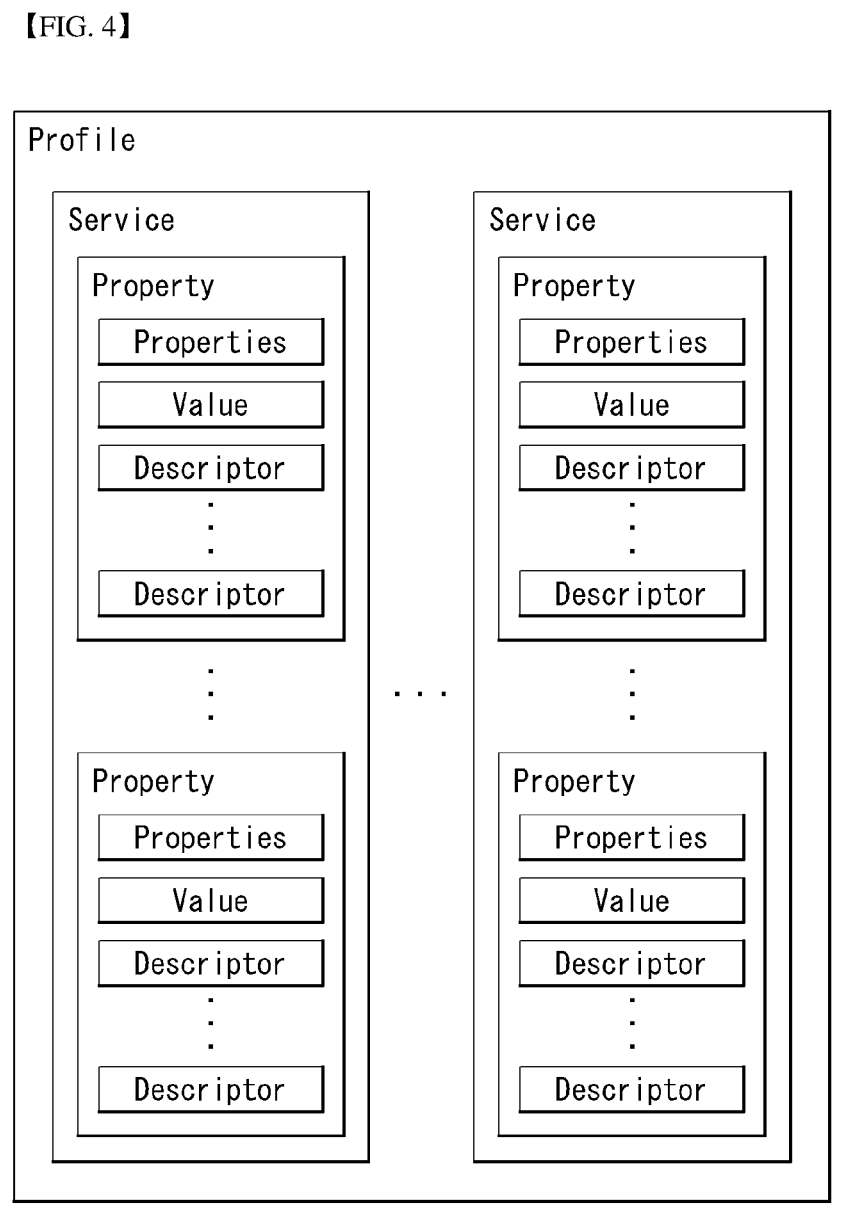

【FIG. 4】

【FIG. 5】
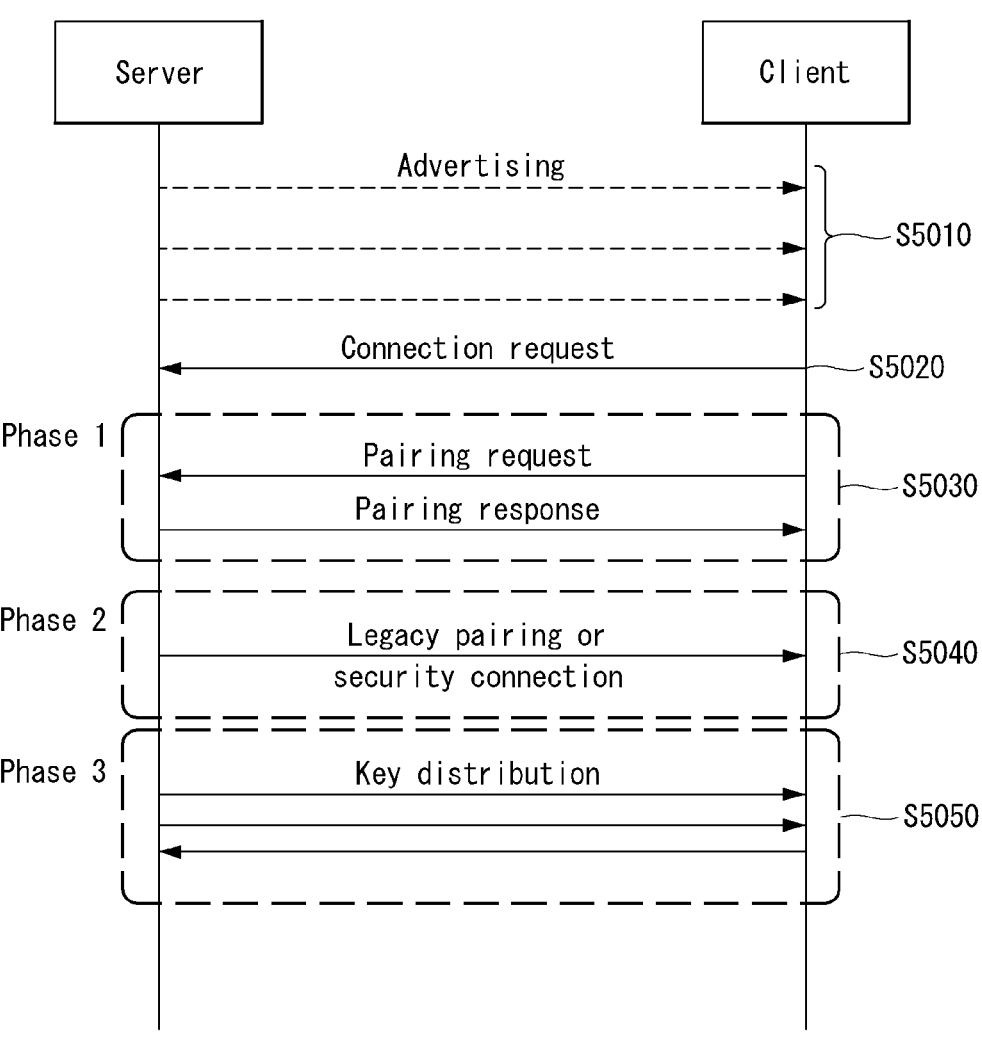

【FIG. 6】
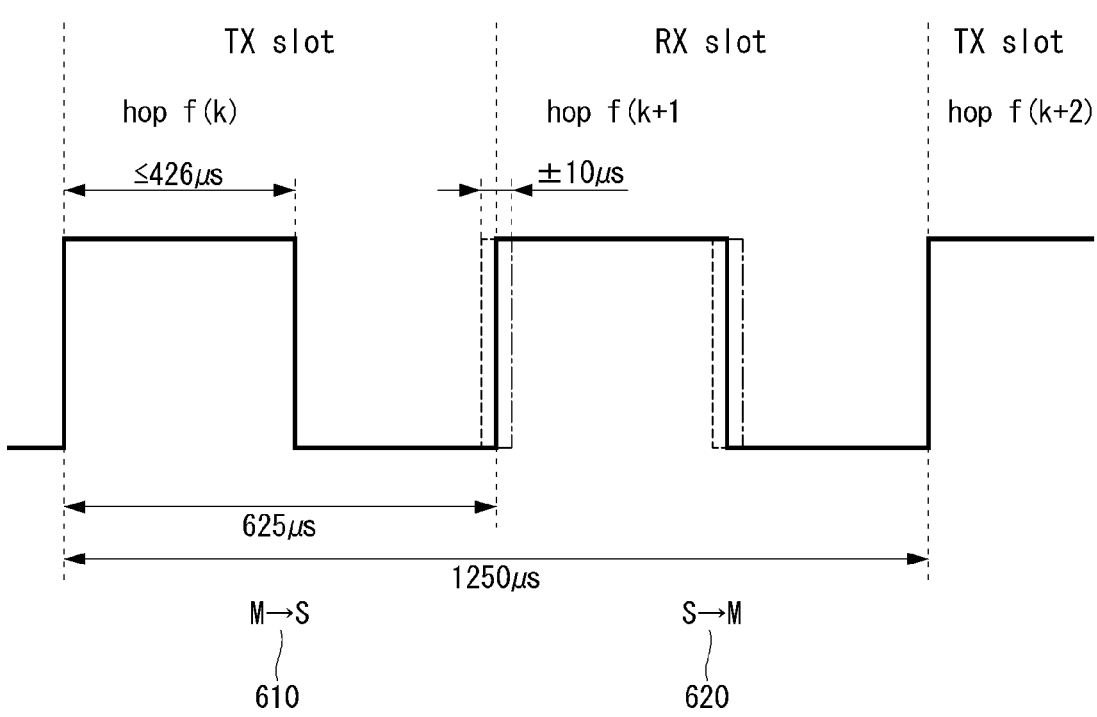

【FIG. 7】
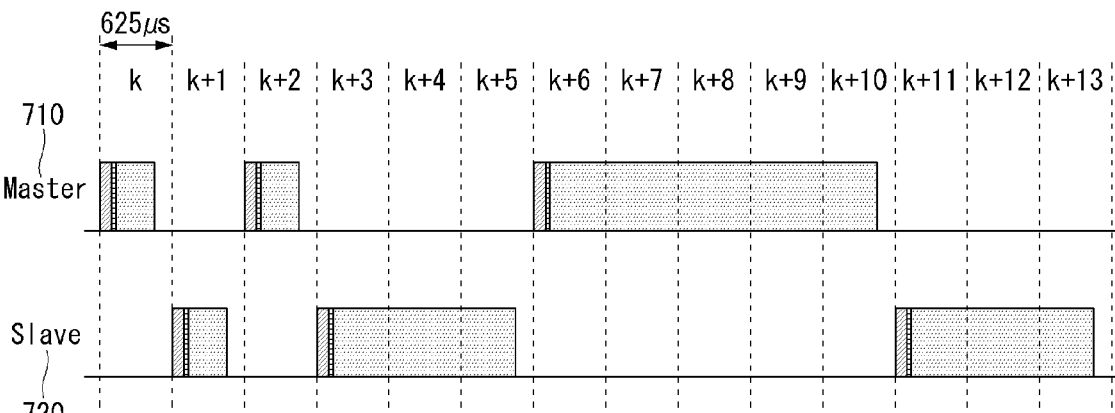

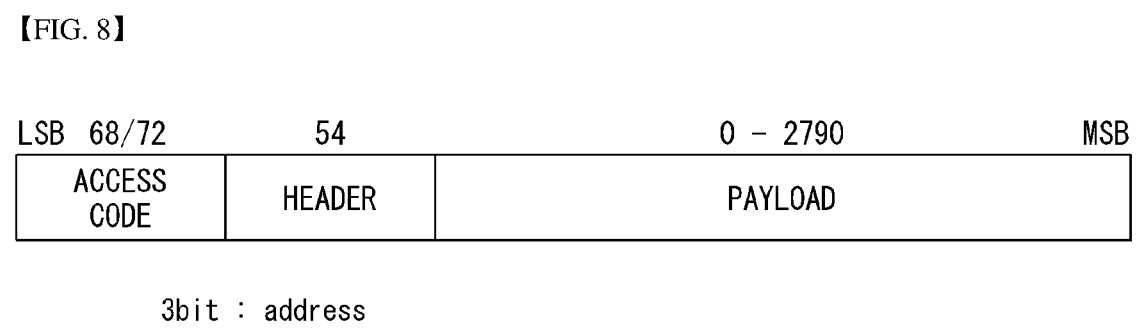

【FIG. 8】

| LSB   68/72 | 54 | 0 − 2790           MSB |
|---|---|---|
| ACCESS CODE | HEADER | PAYLOAD |

3bit : address

【FIG. 9】
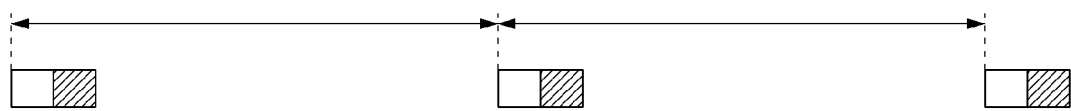

【FIG. 10】
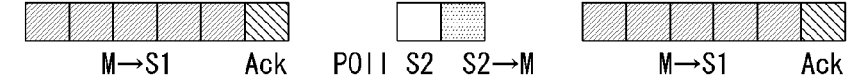
M→S1        Ack    POⅠⅠ S2  S2→M        M→S1        Ack    POⅠⅠ S2  S2→M 【FIG. 11】
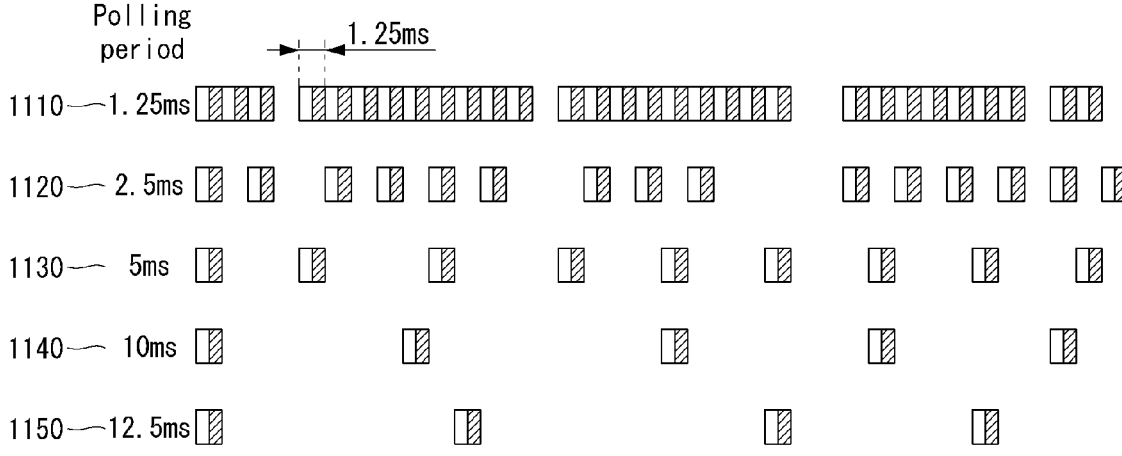

【FIG. 12】
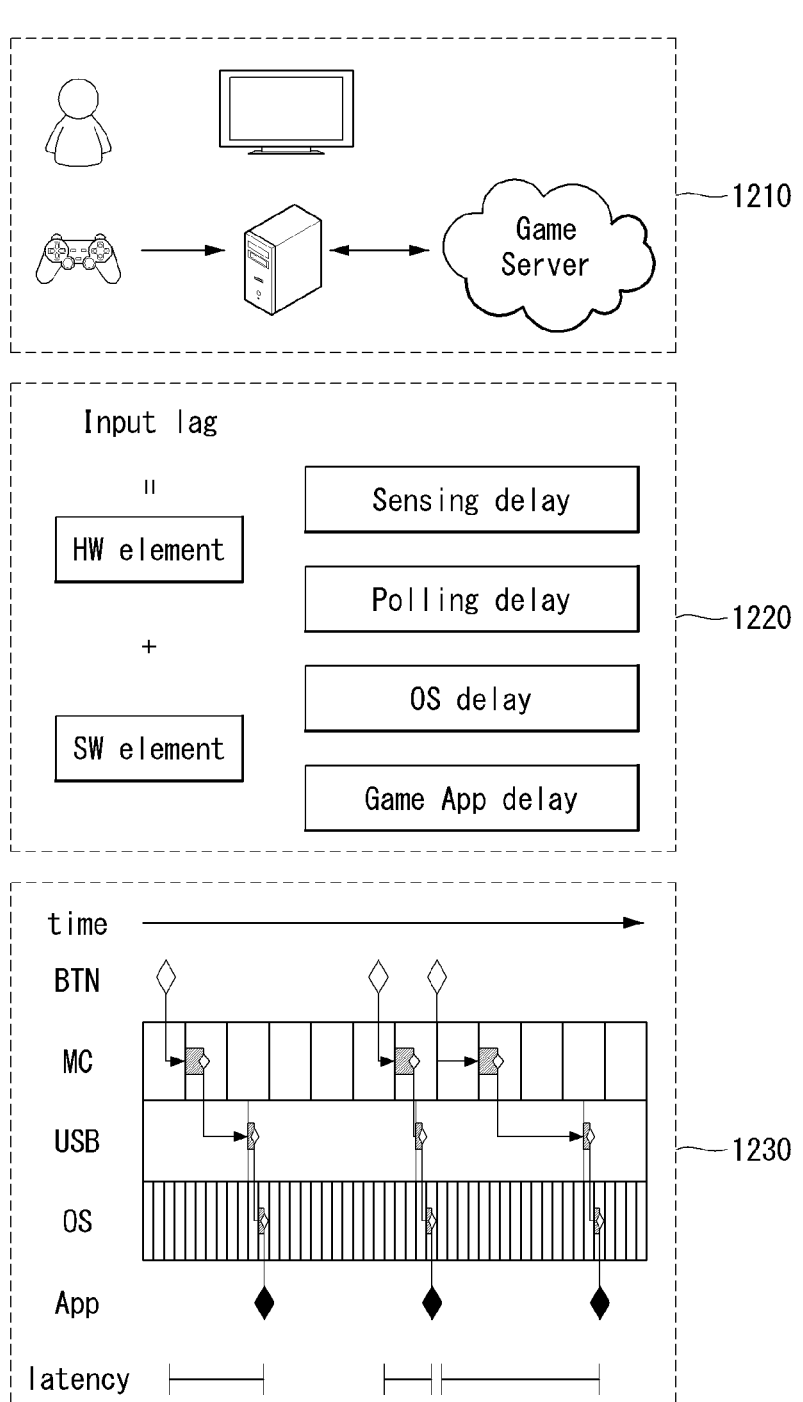

【FIG. 13】
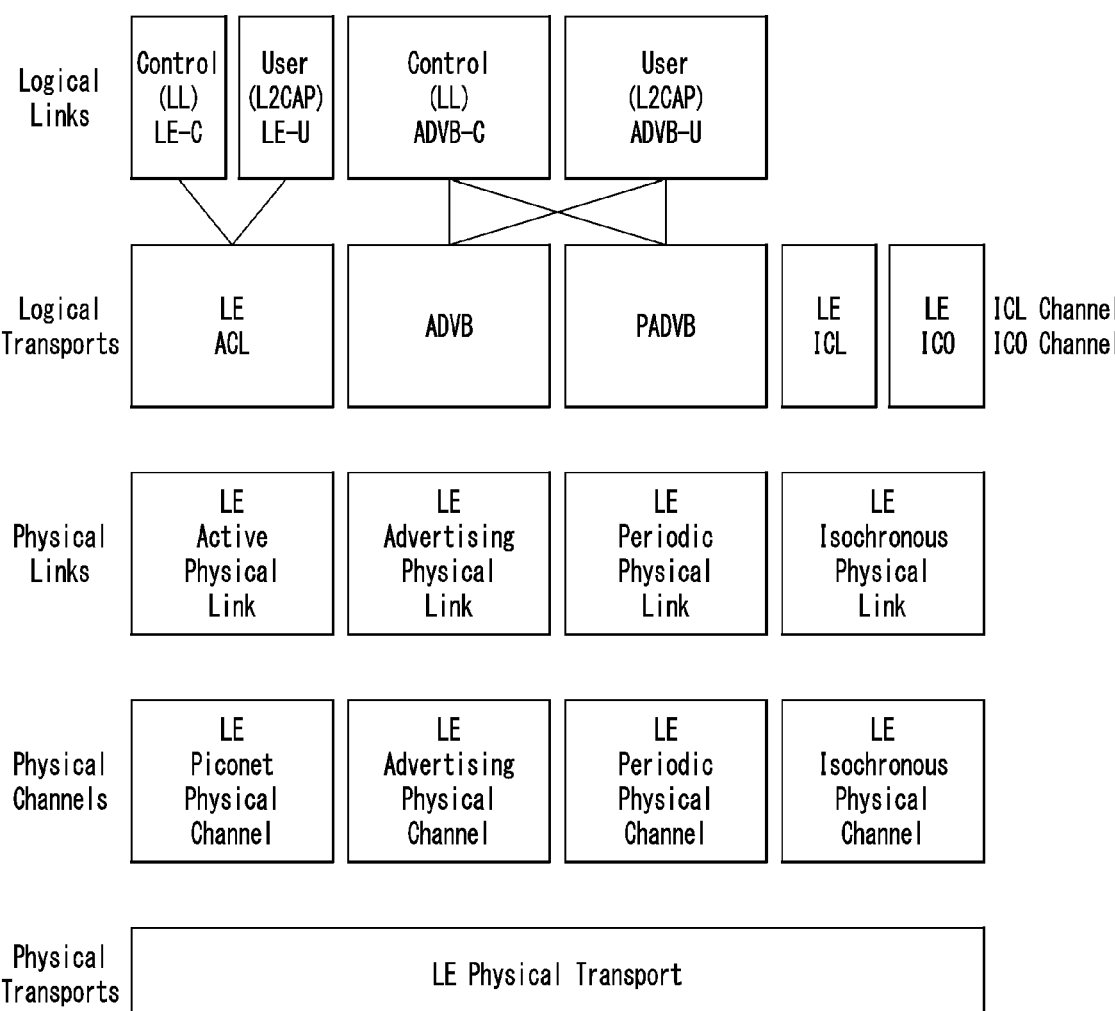

【FIG. 14】
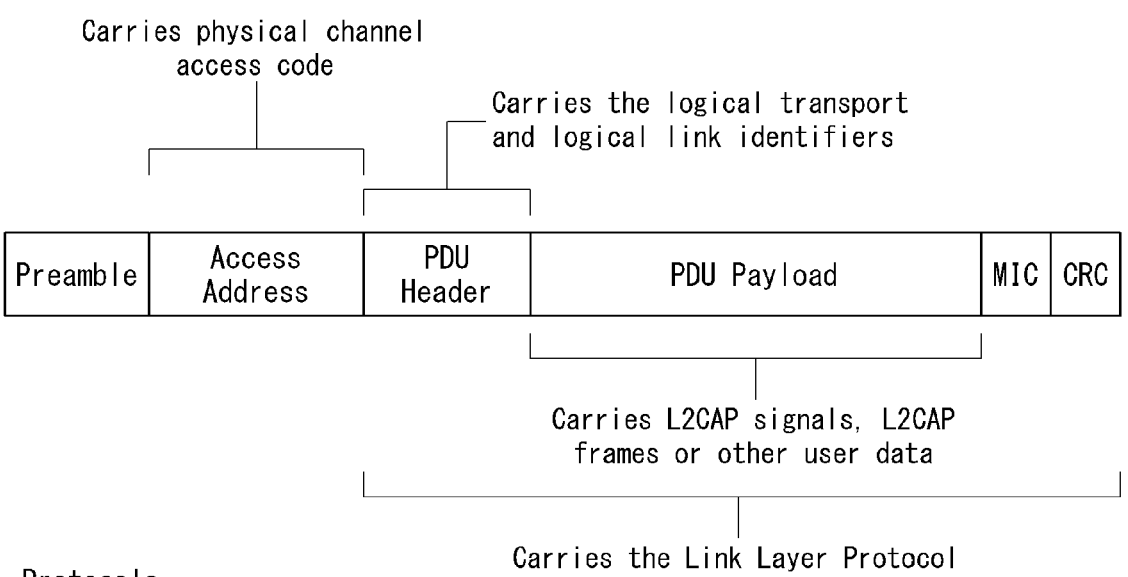

【FIG. 15】
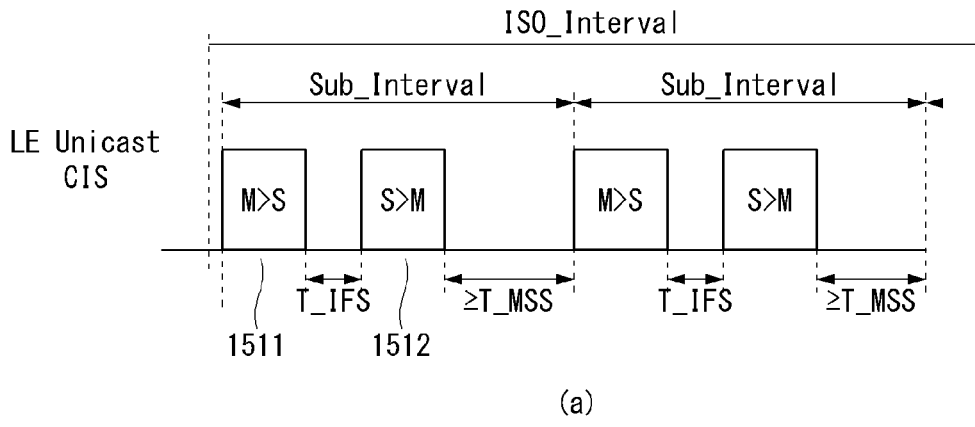
(a)
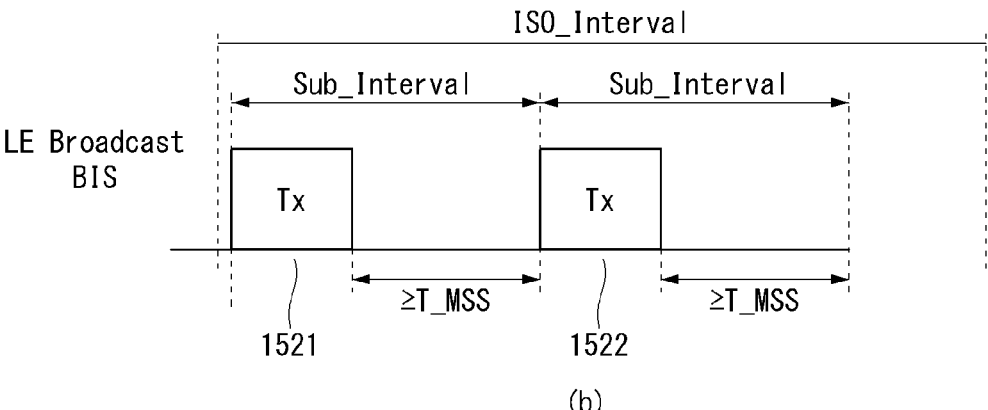
(b)

【FIG. 16】
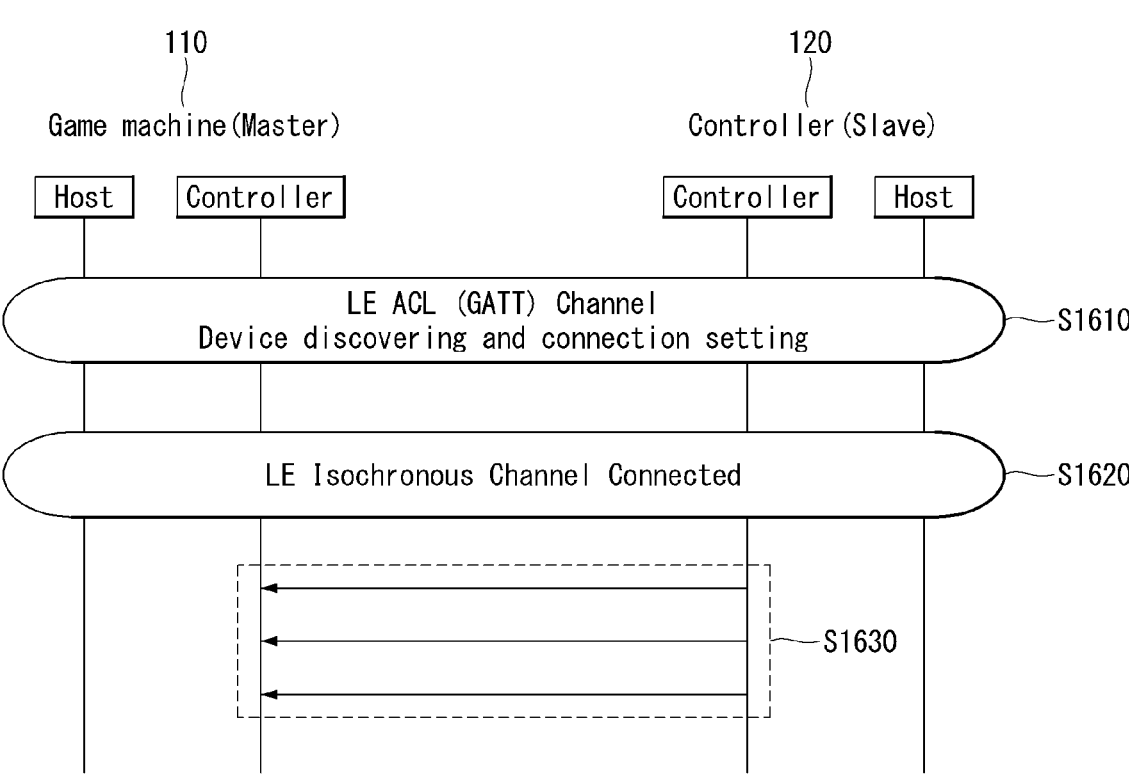

【FIG. 17】
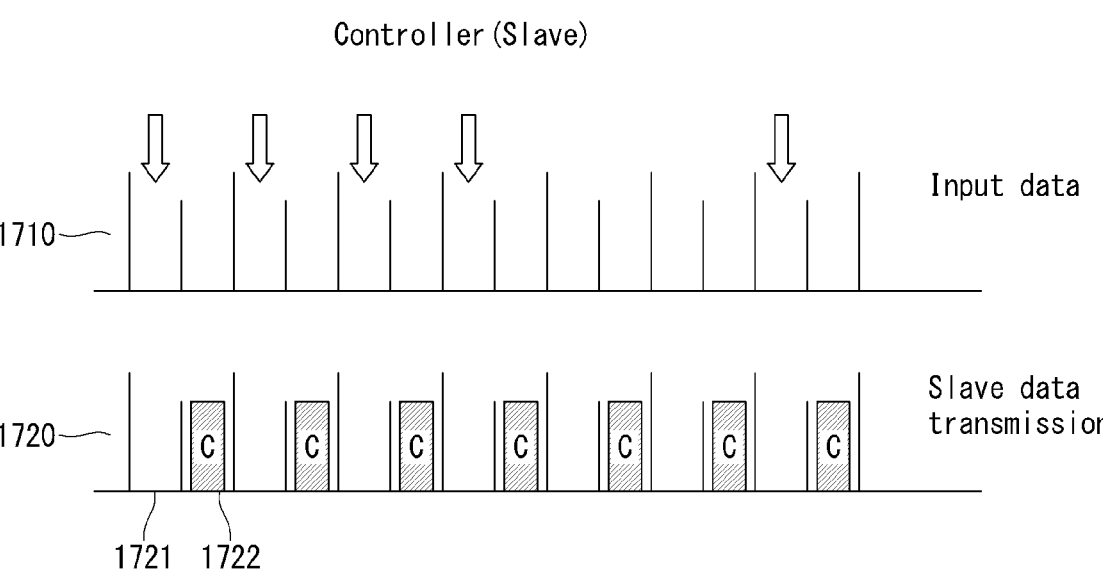

【FIG. 18】
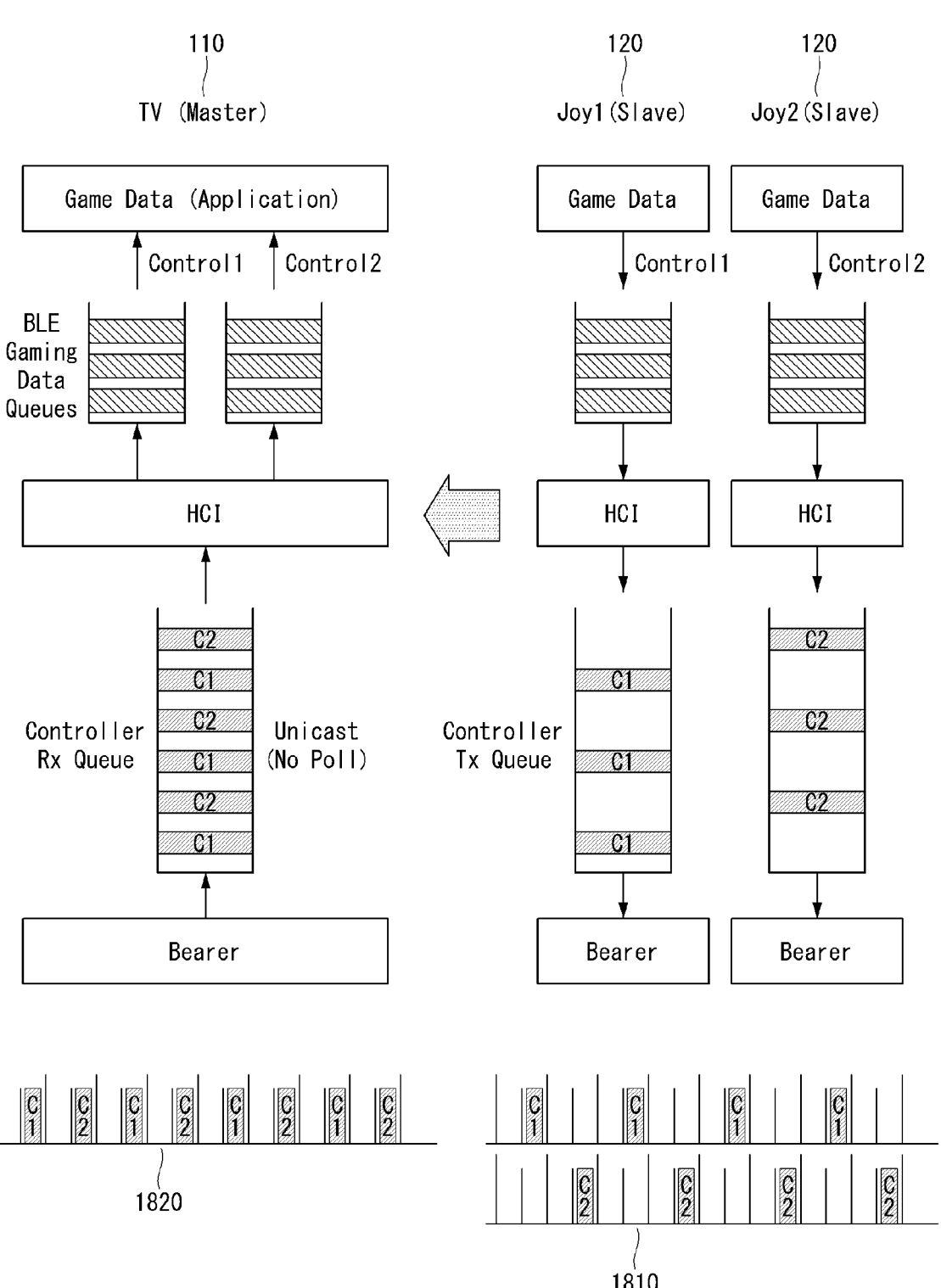

【FIG. 19】
1910 —
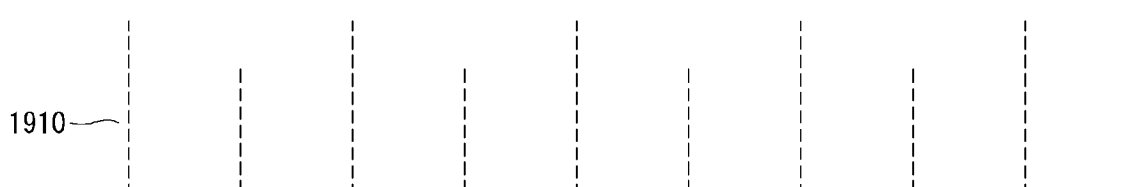
1920 —
1930 —
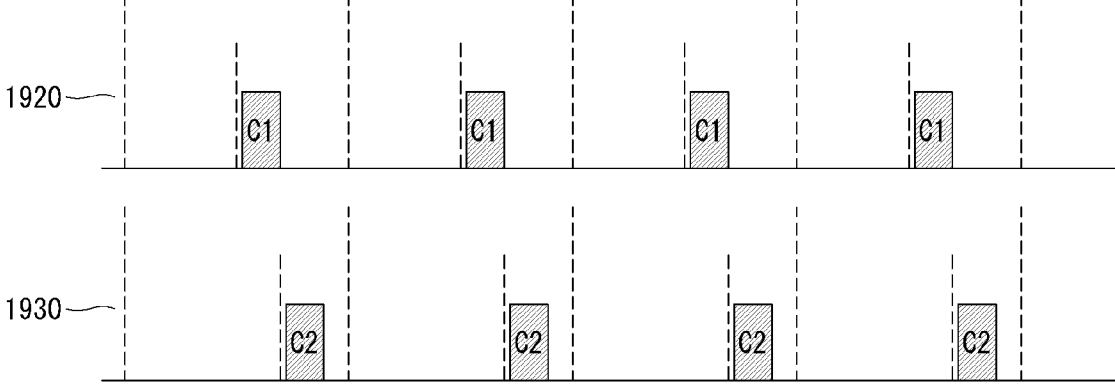

【FIG. 20】
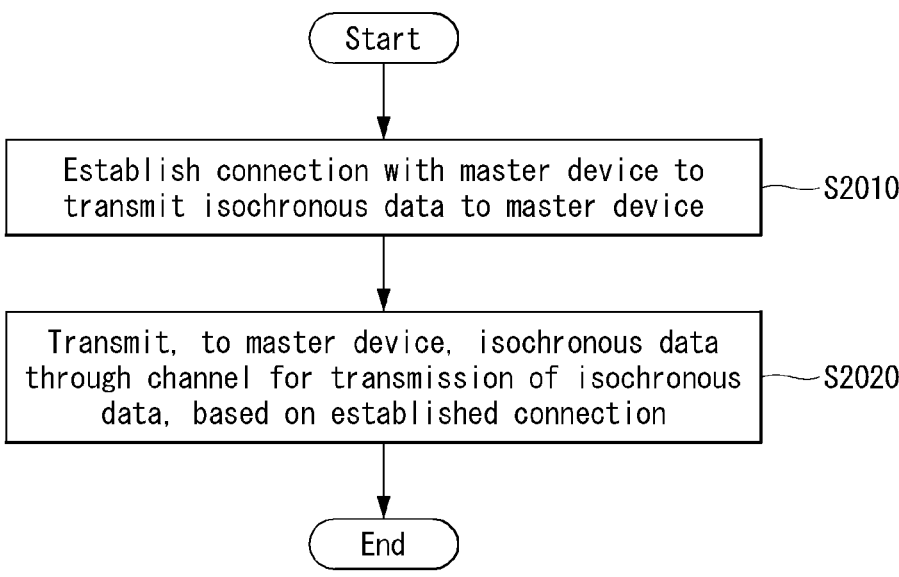

METHOD AND APPARATUS FOR TRANSMITTING ISOCHRONOUS DATA IN SHORT-RANGE WIRELESS COMMUNICATION SYSTEM

This application is the National Stage filing under 35 U.S.C. 371 of International Application No. PCT/KR2021/016742 filed on Nov. 16, 2021, which claims priority to Korean Patent Application No. 10-2020-0152966 filed on Nov. 16, 2020, the contents of which are all hereby incorporated by reference herein in their entirety.

TECHNICAL FIELD

The present disclosure relates to a method for transmitting data by using Bluetooth technology which is short-distance communication technology in a wireless communication system and an apparatus therefor, and more particularly to a method and an apparatus for transmitting isochronous data by using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method for transmitting isochronous data in a short-distance wireless communication system, and an apparatus therefor.

Further, an object of the present disclosure is to provide a method for transmitting, by a plurality of slave devices, isochronous data to a master device with a low delay, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method and apparatus for receiving isochronous data in a short-distance wireless communication system.

According to an embodiment of the present disclosure, a method, by a slave device, of transmitting isochronous data in a short-distance wireless communication system, the method comprises: establishing a connection with a master device to transmit the isochronous data to the master device; and transmitting, to the master device, the isochronous data through a channel for transmission of the isochronous data, based on the established connection; wherein the transmission of the isochronous data through the channel is performed based on a periodically allocated transmission interval, and wherein the isochronous data is data generated based on a user input.

Preferably, the transmission interval includes (i) a first transmission interval for data transmission from the master device to the slave device and (ii) a second transmission interval for data transmission from the slave device to the master device.

Preferably, based on the user input being in the transmission interval, the transmission of the isochronous data in the transmission interval is performed.

Preferably, based on the user input not being in the transmission interval, the transmission of the isochronous data in the transmission interval is omitted.

Preferably, the isochronous data is transmitted in the second transmission interval of the transmission interval.

Preferably, (i) a ratio occupied by the first transmission interval in all of the transmission period and (ii) a ratio occupied by the second transmission interval in all of the transmission interval are same.

Preferably, based on at least one slave device other than the slave device transmitting isochronous data to the master device, isochronous data transmission of each of (i) the slave device and (ii) the at least one slave device is performed in different transmission intervals.

Preferably, a number of the different transmission intervals is equal to a number of (i) the slave device and (ii) the at least one slave device.

Preferably, the method further comprises: receiving, from the master device, transmission interval allocation method information on a method in which the different transmission intervals are allocated to (i) the slave device and (ii) each of the at least one slave device.

Preferably, the transmission interval in which the slave device transmits the isochronous data is determined based on the transmission interval allocation method information.

Preferably, a specific time interval including the different transmission intervals is periodically repeated.

Preferably, a method of the different transmission intervals being allocated to (i) the slave device and (ii) the at least one slave device within the specific time interval is configured identically for each the specific time interval.

Preferably, a method of the different transmission intervals being allocated to (i) the slave device and (ii) the at least one slave device within the specific time interval is changed for each the specific time interval.

Preferably, for the slave device, (i) a ratio occupied by the first transmission interval in all of the transmission period and (ii) a ratio occupied by the second transmission interval in all of the transmission interval are set differently.

Preferably, (i) a ratio occupied by the first transmission interval in all of the transmission period is larger than (ii) a ratio occupied by the second transmission interval in all of the transmission interval.

Preferably, based on at least one slave device other than the slave device transmitting isochronous data to the master device, isochronous data transmission of each of (i) the slave device and (ii) the at least one slave device is performed in single transmission interval.

Preferably, a ratio between the first transmission interval and the second transmission interval is configured as a different value for each of (i) the slave device and (ii) the at least one slave device.

Preferably, the method further comprises: receiving, from the master device, information on a ratio between (i) the first transmission interval and (ii) the second transmission interval.

Preferably, for the master device, (i) a ratio occupied by the first transmission interval in all of the transmission period and (ii) a ratio occupied by the second transmission interval in all of the transmission interval are set equally, and at least one isochronous data which all of each of (i) the slave device and (ii) the at least one slave device transmits is included in the second transmission interval which is configured by the master device.

According to an embodiment of the present disclosure, a slave device transmitting isochronous data in a short-range wireless communication system, the slave device comprises: a transmitter for transmitting a radio signal; a receiver for receiving a radio signal; at least one processor; and at least one computer memory operably connectable to the at least one processor and storing instructions that, when executed by the at least one processor, perform operations; wherein the operations comprise: establishing a connection with a master device to transmit the isochronous data to the master device; and transmitting, to the master device, the isochronous data through a channel for transmission of the isochronous data, based on the established connection; wherein the transmission of the isochronous data through the channel is performed based on a periodically allocated transmission interval, and wherein the isochronous data is data generated based on a user input.

Advantageous Effects

In accordance with the present disclosure, there is an effect that isochronous data can be transmitted in a short-distance wireless communication system.

Further, in accordance with the present disclosure, there is an effect that a plurality of slave devices can transmit the isochronous data to a master device with a low delay.

Further, in accordance with the present disclosure, there is an effect that even though the plurality of slave devices transmits the isochronous data, the plurality of slave devices can transmit the isochronous data to the master device with a delay of the same degree as a case of transmitting, by only one slave device, the isochronous data.

Further, in accordance with the present disclosure, there is an effect that a data transmission rate of a short-distance wireless communication system constituted by the master device and the slave device can be enhanced.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present disclosure, provide embodiments of the present disclosure, and together with the detailed description, describe the technical features of the present disclosure.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 is a diagram illustrating an example of a data transmitting/receiving method in a BR/EDR scheme for assisting understanding the method proposed by the present disclosure.

FIG. 7 is a diagram illustrating another example of the data transmitting/receiving method in a BR/EDR scheme for assisting understanding the method proposed by the present disclosure.

FIG. 8 is a diagram illustrating an example of a data packet format for data transmission/reception in the BR/EDR scheme for assisting understanding the method proposed by the present disclosure.

FIG. 9 is a diagram illustrating yet another example of the data transmitting/receiving method in a BR/EDR scheme for assisting understanding the method proposed by the present disclosure.

FIG. 10 is a diagram illustrating still yet another example of the data transmitting/receiving method in a BR/EDR scheme for assisting understanding the method proposed by the present disclosure.

FIG. 11 is a diagram illustrating still yet another example of the data transmitting/receiving method in a BR/EDR scheme for assisting understanding the method proposed by the present disclosure.

FIG. 12 is a diagram illustrating an example of using a game content using Bluetooth low energy for assisting understanding the method proposed by the present disclosure.

FIG. 13 is a diagram illustrating an example of a protocol stack to which the method proposed by the present disclosure may be applied.

FIG. 14 is a diagram illustrating an example of a data packet format which may be used in the protocol stack to which the method proposed by the present disclosure may be applied.

FIG. 15 is a diagram illustrating an example of a data transmitting/receiving method to which the method proposed by the present disclosure may be applied.

FIG. 16 is a diagram illustrating an example in which the method proposed by the present disclosure is performed.

FIG. 17 is a diagram illustrating an example of isochronous data transmission of a slave device.

FIG. 18 is a diagram illustrating an example of an isochronous data transmitting method of the slave device proposed by the present disclosure.

FIG. 19 is a diagram illustrating another example of the isochronous data transmitting method of the slave device proposed by the present disclosure.

FIG. 20 is a flowchart showing an example in which the isochronous data transmitting method in the short-distance wireless communication system proposed by the present disclosure is performed by the slave device.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the master device 110 includes a user input interface 112, a power supply unit 113, a control unit 114, a memory unit 115), a network interface including a Bluetooth interface (Network Interface, 116), a storage (Storage, 117), an output unit (Display Unit, 118), and a multimedia module (Multi media Module, 119).

A network interface including the input unit (User Input Interface, 112), the power supply unit (Power Supply Unit, 113), the control unit (Control Unit, 114), the memory (Memory Unit, 115), and a Bluetooth interface (Bluetooth Interface) (Network Interface, 116), storage (Storage, 117), output unit (Display Unit, 118), and multimedia module (Multi media Module, 119) are functionally connected to each other to perform the method proposed in this specification.

In addition, as shown in FIG. 2, the slave devices (#1 and #2) 120 include an input unit (User Input Interface) 122, a power supply unit (Power Supply Unit) 123, a control unit (Control Unit, 124), memory (Memory Unit, 125), network interface (Network Interface, 126) including Bluetooth interface, storage (Storage, 127), output unit (Display Unit, 128), multi media module (Multi media Module, 129).

A network interface including the input unit (User Input Interface, 122), the power supply unit (Power Supply Unit, 123), the control unit (Control Unit, 124), the memory (Memory Unit, 125), and a Bluetooth interface (Bluetooth Interface) (Network Interface, 126), storage (Storage, 127), output unit (Display Unit, 128), and multimedia module (Multi media Module, 129) are functionally connected to each other to perform the method proposed in this specification.

The network interfaces 116 and 126 refer to units (or modules) capable of transmitting requests/responses, commands, notifications, instruction/confirmation messages, etc., or data between devices using Bluetooth technology.

The memories 115 and 125 are units implemented in various types of devices and refer to units in which various types of data are stored. Also, the storages 117 and 127 refer to units that perform a function similar to that of a memory.

The controllers 114 and 124 refer to a module that controls the overall operation of the master device 110 or the slave device 120, requests to transmit a message to a network interface, or controls to process a received message.

The controllers 114 and 124 may include an application-specific integrated circuit (ASIC), another chipset, a logic circuit, and/or a data processing device.

The memories 115 and 125 may include read-only memory (ROM), random access memory (RAM), flash memory, memory card, storage medium, and/or other storage devices.

The memories 115 and 125 may be inside or outside the processors 114 and 124, and may be connected to the processors 114 and 124 by various well-known means.

The output units 118 and 128 refer to modules for providing device status information and message exchange information to users through screens.

The power supply unit (power supply unit, 113, 123) refers to a module that receives external power and internal power under the control of the control unit and supplies power necessary for the operation of each component.

As discussed above, the BLE technology has a small duty cycle and can greatly reduce power consumption through a low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by establishing the encrypted link.

General Matters Related to Isochronous Channel

With respect to an audio signal, audio streaming data or audio data may be periodically generated at an idle event interval.

The audio data is generated periodically (or at a specific time interval) according to a feature thereof. Here, the specific time interval at which the audio data is periodically generated may be expressed as idle event interval. Each audio data is transmitted at each idle event interval. Further, each audio data may be transmitted through an entire interval or a partial interval of the idle event interval. When the audio streaming data which is generated periodically or regularly is transmitted by using a BLE mechanism, an advertising and scanning procedure, a communication procedure, and a disconnection procedure should be performed whenever the generated audio data is transmitted/received. However, the audio data is generally periodically generated, and latency guarantee for audio data transmission is required regardless of a data mount of the audio data.

However, when the advertising and scanning procedure, the communication procedure, and the disconnection procedure should be performed each time newly generated audio data is transmitted, there is a problem in that latency occurs in audio data transmission.

In audio data transmission through hearing aids (HA) or headset, a data generation amount is comparatively small, so when BLE technology is utilized, higher energy efficiency may be obtained than Bluetooth BR/EDR technology, but since a data channel process of the BLE technology should perform advertising, connection, etc., every data transmission as described above, the data transmission has large overhead, and in particular, latency guarantee absolutely required for the audio data transmission may not be guaranteed.

Further, since the data channel process of the BLE technology has a purpose of transmitting isolatedly generated data only as necessary, and inducing deep sleep of a BLE device in other time domains to increase energy efficiency, it may be difficult to apply the data channel process of the BLE technology to transmission of periodically generated audio data.

Definition of Isochronous Channel and Mechanism Related Thereto

A new channel, i.e., an isochronous channel is defined in order to transmit the periodically generated data by using the BLE technology.

The isochronous channel is a channel used for transmitting the isochronous data between devices (e.g., conductor-member) using an isochronous stream.

The isochronous data refers to data transmitted at a specific time interval, i.e., periodically or regularly.

That is, the isochronous channel may represent may a channel in which the periodically generated data such as the audio data or voice data is transmitted/received in the BLE technology.

The isochronous channel may be used for transmitting/receiving the audio data to/from a single member, a set of one or more coordinated members, or multiple members.

Further, the isochronous channel corresponds to a flushing channel which may be used for transmitting/receiving key data in the isochronous stream such as an audio streaming or other time domains.

When using a content of a game using Bluetooth low energy, a slave device which is a game controller and a master device which is a game machine body are connected, and in this case, a user input which is input into the slave device is delivered to the master device according to a connection scheme of the slave device and the master device, and an input delay which is a time required for processing in the master device occurs.

When the slave device which is the game controller and the master device which is the game machine body are connected wiredly, the delay or jitter by the connection scheme may be close to 0 ms, so most input delays in the connection between the slave device and the master device is a wired connection may be delays by software (SW) processing.

On the contrary, when the slave device which is the game controller and the master device which is the game machine body are connected wirelessly, a delay by a wireless connection scheme occurs, so the delay and jitter by the connection scheme may occur. In particular, in the case of a wireless connection by a Bluetooth BR/EDR standard scheme, the delay and jitter may occur due to a 12/5-ms polling scheme which is a standard recommendation specification. Further, when multiple slave devices are connected to one master device, change widths of the delay and the jitter may be further increased by an Async wireless connection scheme.

Data transmission/reception is available which is based on a sub event which is a smaller unit than a slot (625 us) which is a BR/EDR basic time unit through an LE isochronous channel designed for audio transmission in which isochronism of data transmission is guaranteed, and the isochronism is guaranteed, so poll transmission of the master device is not required unlike the BR/EDR scheme.

The present disclosure proposes a method for transmitting data traffic of the slave device which is the game controller on an LE isochronous channel. More specifically, the method proposed by the present disclosure relates to a method for guaranteeing the connection between multiple slave devices and the master device which is (i) within 1-ms delay and (ii) without jitter variation.

FIG. 6 is a diagram illustrating an example of a data transmitting/receiving method in a BR/EDR scheme for assisting understanding the method proposed by the present disclosure. More specifically, FIG. 6 is a diagram illustrating a BR/EDR data transmission/reception time interval from the viewpoint of the master device. Here, the time interval may be a slot. In the case of BR/EDR, lengths of one transmission (Tx) slot and one reception (Rx) slot adopt a fixed time length of 625 us. In FIG. 6, reference numeral 610 represents a time interval in which the master device transmits data to the slave device, and reference numeral 620 represents a time interval in which the master device receives data from the slave device.

FIG. 7 is a diagram illustrating still yet another example of the data transmitting/receiving method in a BR/EDR scheme for assisting understanding the method proposed by the present disclosure. In FIG. 7, reference numeral 710 represents a time interval in which the master device transmits data to the slave device, and reference numeral 720 represents a time interval in which the master device receives data from the slave device. In FIG. 7, a length of one Tx/Rx slot is fixed to 625 us, and data transmission of each of the master device/the slave device is performed a time division multiplexing (TDM) scheme. In this case, data transmission of each of the master device/the slave device may be performed during time intervals of 1, 3, and 5-slot sizes. Further, the data transmission of the master device to the slave device may be performed in an even slot, and data reception of the master device from the slave device may be performed in an odd slot. Referring to reference numeral 710 of FIG. 7, an example in which the data transmission of the master device to the slave device is performed during time intervals of the 1-slot size and the 5-slot size is illustrated. Further, referring to reference numeral 720 of FIG. 7, an example in which the data reception of the master device from the slave device is performed during the time intervals of the 1-slot size and the 3-slot size is illustrated.

FIG. 8 is a diagram illustrating an example of a data packet format for data transmission/reception in the BR/EDR scheme for assisting understanding the method proposed by the present disclosure. Referring to FIG. 8, it can be seen that the data packet format in the BR/EDR scheme is configured to include an ACCESS CODE field, a HEADER field, and a PAYLOAD field.

FIG. 9 is a diagram illustrating yet another example of the data transmitting/receiving method in a BR/EDR scheme for assisting understanding the method proposed by the present disclosure. More specifically, FIG. 9 relates to an example of a data transmitting/receiving method of the BR/EDR scheme based on a synchronous connection oriented (SCO) link. In the case of the BR/EDR-scheme data transmission/reception based on the SCO link, HV1 (1/3 FEC), HV2 (2/3 FEC), and HV3 (No FEC) packets may be used. SCO logical transport in the BR/EDR-scheme data transmission/reception based on the SCO may be transmission between symmetric points between the master device and the slave device. The SCO link based transmission/reception may be preferably used for voice communication.

FIG. 10 is a diagram illustrating still yet another example of the data transmitting/receiving method in a BR/EDR scheme for assisting understanding the method proposed by the present disclosure. More specifically, FIG. 10 relates to an example of a data transmitting/receiving method of the BR/EDR scheme based on a synchronous connection-(ACL) link. In the case of the data transmitting/receiving method of the BR/EDR scheme based on the ACL link, the master device may exchange a data packet with all slave devices for each slot in a slot not reserved for the SCO logical transport. A packet exchange connection between (i) the master slave and (ii) all active slaves which participate in a piconet may be provided based on the ACL logical transport. Further, both asynchronous and isochronous services may be supported based on the ACL link. There should be only a single ACL logical transport between both devices that transmits and receives data based on the ACL link. Packet retransmission may be applied to the ACK packet in order to guarantee data integrity.

FIG. 11 is a diagram illustrating still yet another example of the data transmitting/receiving method in a BR/EDR scheme for assisting understanding the method proposed by the present disclosure. In the case of the data transmission/reception in the BR/EDR scheme, since an asynchronous channel is used for data transmission of the slave device which is the game controller, it is difficult to guarantee that a controller of the slave device transmits data according to a polling cycle decided by a host of the slave device.

In FIG. 11, reference numerals 1110 to 1150 represent cases where the polling cycles 1.25 ms, 2.5 ms, 5 ms, 10 ms, and 12.5 ms, respectively. Here, since a minimum slot length of the BR/EDR is 625 us, a sum of lengths of slots for transmitting a poll and data may become at least 625 us×2=1.25 ms. When the poll and the data are transmitted according to the cycle of 1.25 ms which is a minimum cycle, the master device may transmit data 800 times per second. However, in the case of the asynchronous transmission scheme, even though the transmission cycle is fixed in the host, the data is transmitted by a best effort scheme in the controller, so it is difficult to transmit the data at a constant time interval in an air interface. That is, referring to reference numeral 1110 of FIG. 11, the pole and the data are configured to be transmitted the cycle of 1.25 ms, but a time space in which the poll and the data are not transmitted is generated, and as a result, a jitter variation occurs. Referring to reference numerals 1120 to 1150 of FIG. 11, it may be confirmed that the pole and the data may be transmitted at the cycles of 2.5 ms, 5 ms, 10 ms, and 12.5 ms in order to use other traffic, but there is the same problem even in the case of reference numerals 1120 to 1150 of FIG. 11 as in the case of reference numeral 1110.

FIG. 12 is a diagram illustrating an example of using a game content using Bluetooth low energy for assisting understanding the method proposed by the present disclosure.

1210: Referring to FIG. 12, the slave device which is the game controller is connected to the master device which is the game body wiredly or wirelessly. Here, the master device may be a machine such as a PC or a game machine. When the slave device is connected to the master device wiredly, both devices may be connected by a USB scheme, and may follow a poll/data transmission scheme according to a USB HID standard. A polling cycle of the wired USB scheme may be set to 2 ms, 5 ms, and 10 ms from at least 1 ms. When the slave device is connected to the master device wirelessly, both devices may be connected by the Bluetooth scheme, and may follow a poll/data transmission scheme according to the Bluetooth HID standard. A polling cycle of the Bluetooth scheme may be set to 2.5 ms, 5 ms, 10 ms, and 12.5 ms from at least 1.25 ms.

1220: An input lag for the slave device which is the game controller may be determined based on (i) sensing delay and (ii) polling delay which are hardware elements, and (i) OS delay and (ii) game app delay which are software elements. Here, the sensing delay means a time required for the slave device which is a micro controller (MC) to recognize a user input value input into the slave device. Further, the polling delay means a time required for transmitting user input data from the slave device to the master device through the USB or Bluetooth. Further, the OS delay means a time for which a controller reception buffer value in a PC or game machine OS, and the game app delay means a time required for reading OSD data in the game SW.

1230: Referring to reference numeral 1230 of FIG. 12, it can be seen that in the case of wireless Bluetooth scheme, the polling delay exerts a largest influence on the input delay.

FIG. 13 is a diagram illustrating an example of a protocol stack to which the method proposed by the present disclosure may be applied. Referring to FIG. 13, the protocol stack to which the method proposed by the present disclosure may be applied may be constituted by Physical Transport(s), Physical Channel(s), Physical link(s), Logical Transport(s), and Logical link(s). In the present disclosure, the physical channel may mean a Synchronized Bluetooth Baseband-compliant RF hopping sequence.

The piconet may mean a set of Bluetooth devices sharing the same physical channel defined by the master parameters (clock and BD_ADDR).

The physical link may be a baseband level link between both devices set by using paging. The physical link may include a transmission slot sequence of a physical channel alternated between the transmission slot of the master device and the transmission slot of the slave device.

Further, an LE isochronous physical channel may have a pseudo-random sequence of the PHY channel, and three additional parameters provided by a master or non-link type broadcaster as a feature. A first parameter may be a channel map representing a PHY channel set, and a second parameter may be a pseudo random number used as an index for all sets of the PHY channel. A third parameter may be a timing of a first data packet. The timing of the first packet of the CIS may be provided to a link layer message transmitted in an ACL link linked by the master in a CIS setting step. The timing of the first packet of the BIS may be referenced in a periodic advertising event related to the BIS.

FIG. 14 is a diagram illustrating an example of a data packet format which may be used in the protocol stack to which the method proposed by the present disclosure may be applied. Referring to FIG. 14, the data packet format which may be used in the protocol stack to which the method proposed by the present disclosure may be applied includes a preamble field, an access address field, a PDU header field, a PDU payload field, MIC, and a CRC field. Purposes of the respective fields are illustrated in FIG. 14.

FIG. 15 is a diagram illustrating an example of a data transmitting/receiving method to which the method proposed by the present disclosure may be applied. More specifically, FIG. 15 is a diagram related to a data transmitting method through the LE isochronous channel. FIG. 15(*a*) is related to data transmission of a unicast scheme through a connected isochronous channel (CIS), and FIG. 15(*b*) is related to data transmission of a broadcast scheme through a broadcast isochronous channel (BIS), and The LE isochronous channel is a channel that guarantees isochronism, and it may be guaranteed that a controller of the Bluetooth device transmits data according to a polling cycle set by a host of the Bluetooth device through the LE isochronous channel. A sub_interval similar to the slot defined in the BR/EDR scheme may be used in the LE isochronous channel.

The sub_interval of the unicast channel based on the CIS may have a length of at least 400 us, and may be adjusted by the unit of 30 us. The sub_interval of the broadcast channel based on the BIS may have a length of at least 300 us, and may be adjusted by the unit of 30 us.

An ISO_interval may be set to a length longer than the sub_interval for transmission buffer management. When a time which is as long as the ISO_interval elapsed, the transmission buffer is flushed, and new data may be transmitted.

In the case of the data transmission of the unicast scheme, bidirectional communication between the master device and the slave device may be performed by using the connected isochronous channel (CIS). In the CIS, a connected device may transmit the isochronous data even in any direction. The size of the data may be fixed or variable, and there may be the frame or no frame. The isochronous data may be transmitted in an LE-S or LE-F logical link by using the CIS logical transport. Each CIS should be connected to the ACL. In the case of the CIS, since transmission of (i) packets having various sizes and (ii) transmission of one or more packets in each isochronous event are supported, various data rates may be supported. Data traffic may be transmitted/received between the devices unidirectionally or bidirectionally. In the case of the CIS, an acknowledgment protocol for enhancing reliability of packet delivery may be defined.

In the case of the data transmission of the broadcast scheme, unidirectional communication between the master device and the slave device may be performed by using the broadcast isochronous channel (BIS). That is, referring to FIG. 15(*b*), in the case of the data transmission of the broadcast scheme, data may be broadcasted only in (i) a direction from the slave device to the master device or (ii) a direction from the master device to the slave device. The BIS is a logical transport which allows the device to transmit the isochronous data. The isochronous data may have the frame or no frame. In the case of the BIS, since transmission of (i) packets having various sizes and (ii) transmission of one or more packets in each isochronous event are supported, various data rates may be supported. The data traffic may be performed unidirectionally in the broadcasting device. As a result, in the case of the BIS, the acknowledgment protocol is not defined, and it is difficult to intrinsically guarantee the reliability of isochronous traffic. In the case of the BIS, multiple retransmission may be supported in the BIS in order to enhance the reliability of the packet delivery.

In the case of the LED isochronous channel, the isochronism of data transmission/reception is guaranteed, and a timing for data transmission/reception is shared between the master device and the slave device, so a master poll required for timing synchronization for the data transmission/reception between the master device and the slave device need not be transmitted to the slave device in the asynchronous channel.

FIG. 16 is a diagram illustrating an example in which the method proposed by the present disclosure is performed.

S1610: First, the master device and the slave device may discover each other, and form the connection.

S1620: Next, the master device and the slave device may form a connection for isochronous data transmission. In this case, the connection for the isochronous data transmission may be unicast CIS.

S1630: Thereafter, when there is input data of the user (e.g., a controller button input, a joystick input, etc.), the slave device which is the controller may transmit data to the master device based on a notification scheme in a slave data transmission interval. In this case, since the controller of the slave device knows a slave data transmission timing, the master device may not transmit the poll to the slave device. Therefore, when there is the input data of the user without receiving the poll from the master device, the slave device may transmit the input data to the master device. On the contrary, when there is no input data of the user, the slave device may not perform data transmission to the master device in the slave data transmission interval. Through such a scheme, there is an effect that the slave device need not manage the Rx buffer for receiving the data (poll) from the master device. Further, there is an effect that the master device transmits the poll, and then need not manage a timeout for reception of the data which the slave device transmits to the master device within one sub_interval.

FIG. 17 is a diagram illustrating an example of isochronous data transmission of a slave device. More specifically, FIG. 17 relates an example of an operation in which the user input is input into one slave device, and the isochronous data for the input user input is transmitted on the LE isochronous channel by the slave device. In FIG. 17, reference numeral 1710 represents an operation in which the input data of the user is input into the slave device, and reference numeral 1720 represents an operation in which the slave device transmits the input data onto the LE isochronous channel. In FIG. 17, transmission of the isochronous data on the LE isochronous channel is performed based on a periodically allocated transmission interval. The transmission interval includes (i) a transmission interval (a first transmission interval) 1711 for data transmission from the master device to the slave device and)ii) a transmission interval (a second transmission interval) 1721 for data transmission from the slave device to the master device.

Referring to FIG. 17, when there is the input data of the user in the transmission interval, the slave device performs transmission of the isochronous data for the input data in the transmission interval of receiving the input data. On the contrary, when there is no input data of the user in the transmission interval, the slave device omits the transmission of the isochronous data for the input data in the transmission interval of receiving the input data.

Hereinafter, referring to FIGS. 18 and 19, a case where a plurality of slave devices is connected to the master device to transmit the isochronous data will be described.

EXAMPLE 1

The example relates to a method in which when there are two or more slave devices as the game controller, a data transmission interval of the slave device is used interchangeably between the slave devices. In the example, transmission intervals set with respect to the master device and the slave device connected to the master device, respectively may have the same type.

FIG. 18 is a diagram illustrating an example of an isochronous data transmitting method of the slave device proposed by the present disclosure. More specifically, FIG. 18 relates to an example in which two slave devices 120 transmit the isochronous data to the master device 110. In FIG. 18, two slave devices may interchangeably use the transmission interval of the slave device (1810). Reference numeral 1810 of FIG. 18 shows a type in which data is sent from a bearer of each slave device to controller Tx queues of the slave devices. For such an operation, the master device may form the unicast connection with all slave devices in order to share the transmission timing with the slave device. In FIG. 18, control signals (isochronous data) of the slave devices may be transmitted based on multiple MACs. Reference numeral 1820 of FIG. 18 shows a type in which data is received from the bearer of the master to the controller Rx queue. For convenience of description, in FIG. 18, an example in which two slave devices are connected to the master device is primarily described, but the present disclosure is not limited thereto, and the described contents may be applied even to a case where more slave devices than two are connected to the master device in the same/similar scheme.

In the example, in the entire data transmission interval, (i) a ratio occupied by the transmission interval (first transmission interval) for the master device to transmit data to the slave device and (ii) a ratio occupied by the transmission interval (second transmission interval) for the slave device to transmit data to the master device in the entire transmission interval are set equally. Here, the first transmission interval may be appreciated as a time interval configured for the slave device to receive data from the master device (expect to receive data). Further, since there are two or more slave devices that transmit the isochronous data to the master device, it may be appreciated that different transmission intervals are allocated to the slave devices connected to the master device, respectively. Here, the number of different transmission intervals may be equal to the number of slave devices connected to the master device.

Additionally, the slave device may receive, from the master device, information (transmission interval allocation scheme information) on a scheme in which the different transmission intervals are allocated to the slave devices connected to the master device. Each transmission interval in which the slave devices connected to the master device transmit the isochronous data may be determined based on the transmission interval allocation scheme information.

Further, since different transmission intervals are allocated to the plurality of slave devices connected to the master device, respectively, a specific time interval constituted by the different transmission intervals may be set so that each of all of the plurality of slave devices may have a data transmission opportunity once. In this case, the specific time interval may be appreciated as being periodically repeated. Further, a scheme in which the different transmission intervals are allocated to the plurality of slave devices within the specific time interval may be configured to be continuously equal. That is, the scheme in which the different transmission intervals are allocated to the plurality of slave devices within the specific time interval may be configured to be equal every specific time interval. As another example, the scheme in which the different transmission intervals are allocated to the plurality of slave devices within the specific time interval may be updated according to a predetermined interval. For example, the scheme in which the different transmission intervals are allocated to the plurality of slave devices within the specific time interval may be changed every specific time interval. In this case, the time interval allocation scheme changed according to the update may be randomly determined. For example, when four slave devices are connected to the master device, a time interval allocation scheme in a specific time interval for the slave devices may be updated every predetermined cycle like (1-2-3-4)→(2-1-4-3)→(3-4-2-1). When the scheme in which the different transmission intervals are allocated to the plurality of slave devices within the specific time interval is changed at a constant cycle, there is an effect that an equity between users who participate in the game may be guaranteed.

EXAMPLE 2

The example relates to a method in which the transmission interval set in the master device is the same as in Example 1, and the transmission intervals set for the slave devices connected to the master device, respectively are defined in different types.

FIG. 19 is a diagram illustrating another example of the isochronous data transmitting method of the slave device proposed by the present disclosure. More specifically, FIG. 18 relates to an example in which two slave devices 120 transmit the isochronous data to the master device 110. In FIG. 19, two slave devices may transmit the isochronous data in the same transmission interval, and the transmission intervals set for two slave devices, respectively may be defined as different types. More specifically, reference numeral 1910 of FIG. 19 represents the transmission interval set in the master device, reference numeral 1920 represents the transmission interval set in one slave device among two slave devices, and reference numeral 1930 represents the transmission interval set in one remaining slave device. The transmission interval is set as in FIG. 19, and as a result, even though several slave devices are used, transmission of all slave devices is performed within one transmission interval, so there is an effect that the delay may be reduced. That is, the master device may receive the isochronous data from all slave devices within one sub event.

In the example, with respect to the slave device, in the entire data transmission interval, (i) a ratio occupied by the transmission interval (first transmission interval) for the slave device to receive data from the master device in the entire transmission interval of the slave device and (ii) a ratio occupied by the transmission interval (second transmission interval) for the slave device to transmit data to the master device in the entire transmission interval are set differently. Further, (i) the ratio occupied by the first transmission interval in the entire transmission interval may be larger than (ii) the ratio occupied by the second transmission interval in the entire transmission interval.

When the plurality of slave devices transmits the isochronous data to the master device according to the example, the isochronous data transmission of each of the plurality of slave devices may be performed in one transmission interval. In this case, a ratio between (i) the first transmission interval and (ii) the second transmission interval may be set to different values with respect to the plurality of slave devices, respectively.

Additionally, each of the plurality of slave devices may receive, from the master device, information on the ratio (i) the first transmission interval and (ii) the second transmission interval.

In the example, with respect to the master device, (i) a ratio occupied by the transmission interval for the master device to transmit data to the slave device in the entire transmission interval and (ii) a ratio occupied by the transmission interval for the master device to receive data from the slave device in the entire transmission interval are set equally. In this case, at least one isochronous data transmitted by each of the plurality of slave devices may be received in a transmission interval for the master device to receive data from the slave device.

When it is considered that a minimum polling interval of a wired controller is 1 ms, if the LE isochronous channel is used according to the method proposed by the present disclosure, an earlier polling interval than the wired controller may be secured. Further, since the sub event of the LE isochronous channel may be controlled by the unit of 30 us, an average delay may be calculated by controlling the polling interval according to a game requirement. Since the LE isochronous channel may expect that data is transmitted at a continuously constant time unlike the asynchronous channel of the BR/EDR, a jitter variation amount may be reduced as compared with the existing BR/EDR.

Further, according to the method proposed by the present disclosure, since the master device may not send the poll to the slave device, and different data may be transmitted in the transmission interval of the master device, data transmission efficiency may be enhanced twice as compared with the existing BR/EDR method. Additionally, even when the plurality of slave devices is used, the delay is not increased, but the delay may be maintained similarly to a case where only one slave device is used.

FIG. 20 is a flowchart showing an example in which the isochronous data transmitting method in the short-distance wireless communication system proposed by the present disclosure is performed by the slave device.

More specifically, the slave device establishes the connection with the master device in order to transmit the isochronous data to the master device (S2010).

Thereafter, the slave device transmits the isochronous data to the master device on a channel for transmitting the isochronous data based on the established connection (S2020).

Here, the transmission of the isochronous data on the channel is performed based on the periodically allocated transmission interval, and the isochronous data is data generated based on the user input.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed. And, in this disclosure, both the product invention and the method invention are described, and the description of both inventions can be supplementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

The invention claimed is:

1. A method, by a slave device, of transmitting isochronous data in a short-distance wireless communication system, the method comprising:

establishing a connection with a master device to transmit the isochronous data to the master device; and transmitting, to the master device, the isochronous data through a channel for transmission of the isochronous data, based on the established connection;

wherein the transmission of the isochronous data through the channel is performed based on a periodically allocated transmission interval, wherein the isochronous data is data generated based on a user input, wherein the transmission interval includes (i) a first transmission interval for data transmission from the master device to the slave device and (ii) a second transmission interval for data transmission from the slave device to the master device, wherein based on the user input being in the transmission interval, the transmission of the isochronous data in the transmission interval is performed, and wherein based on the user input not being in the transmission interval, the transmission of the isochronous data in the transmission interval is omitted.

2. The method of claim 1, wherein the isochronous data is transmitted in the second transmission interval of the transmission interval.

3. The method of claim 2, wherein (i) a ratio occupied by the first transmission interval in all of the transmission period and (ii) a ratio occupied by the second transmission interval in all of the transmission interval are same.

4. The method of claim 3, wherein based on at least one slave device other than the slave device transmitting isochronous data to the master device, isochronous data transmission of each of (i) the slave device and (ii) the at least one slave device is performed in different transmission intervals.

5. The method of claim 4, wherein a number of the different transmission intervals is equal to a number of (i) the slave device and (ii) the at least one slave device.

6. The method of claim 5, further comprising:

receiving, from the master device, transmission interval allocation method information on a method in which the different transmission intervals are allocated to (i) the slave device and (ii) each of the at least one slave device.

7. The method of claim 6, wherein the transmission interval in which the slave device transmits the isochronous data is determined based on the transmission interval allocation method information.

8. The method of claim 5, wherein a specific time interval including the different transmission intervals is periodically repeated.

9. The method of claim 8, wherein a method of the different transmission intervals being allocated to (i) the slave device and (ii) the at least one slave device within the specific time interval is configured identically for each the specific time interval.

10. The method of claim 8, wherein a method of the different transmission intervals being allocated to (i) the slave device and (ii) the at least one slave device within the specific time interval is changed for each the specific time interval.

11. The method of claim 2, wherein for the slave device, (i) a ratio occupied by the first transmission interval in all of the transmission period and (ii) a ratio occupied by the second transmission interval in all of the transmission interval are set differently.

12. The method of claim 1, wherein (i) a ratio occupied by the first transmission interval in all of the transmission period is larger than (ii) a ratio occupied by the second transmission interval in all of the transmission interval.

13. The method of claim 12, wherein based on at least one slave device other than the slave device transmitting isochronous data to the master device, isochronous data transmission of each of (i)

the slave device and (ii) the at least one slave device is performed in single transmission interval.

14. The method of claim 13, wherein a ratio between the first transmission interval and the second transmission interval is configured as a different value for each of (i) the slave device and (ii) the at least one slave device.

15. The method of claim 13, further comprising: receiving, from the master device, information on a ratio between (i) the first transmission interval and (ii) the second transmission interval.

16. The method of claim 15, wherein for the master device, (i) a ratio occupied by the first transmission interval in all of the transmission period and (ii) a ratio occupied by the second transmission interval in all of the transmission interval are set equally, and wherein at least one isochronous data which all of each of (i) the slave device and (ii) the at least one slave device transmits is included in the second transmission interval which is configured by the master device.

17. A slave device transmitting isochronous data in a short-range wireless communication system, the slave device comprising:
a transmitter for transmitting a radio signal;
a receiver for receiving a radio signal;
at least one processor; and at least one computer memory operably connectable to the at least one processor and storing instructions that, when executed by the at least one processor, perform operations;
wherein the operations comprise:
establishing a connection with a master device to transmit the isochronous data to the master device; and
transmitting, to the master device, the isochronous data through a channel for transmission of the isochronous data, based on the established connection;
wherein the transmission of the isochronous data through the channel is performed based on a periodically allocated transmission interval,
wherein the isochronous data is data generated based on a user input,
wherein the transmission interval includes (i) a first transmission interval for data transmission from the master device to the slave device and (ii) a second transmission interval for data transmission from the slave device to the master device,
wherein based on the user input being in the transmission interval, the transmission of the isochronous data in the transmission interval is performed, and
wherein based on the user input not being in the transmission interval, the transmission of the isochronous data in the transmission interval is omitted.

* * * * *